US007099964B2

(12) United States Patent
Nie et al.

(10) Patent No.: US 7,099,964 B2
(45) Date of Patent: Aug. 29, 2006

(54) HIGH SPEED PROCESSOR

(75) Inventors: Xiaoning Nie, Vaterstetten (DE);
Claudia Mayr, Utting (DE)

(73) Assignee: Infineon Technologies AG, Munich (DE)

( * ) Notice: Subject to any disclaimer, the term of this patent is extended or adjusted under 35 U.S.C. 154(b) by 160 days.

(21) Appl. No.: 09/928,797

(22) Filed: Aug. 13, 2001

(65) Prior Publication Data
US 2002/0103957 A1 Aug. 1, 2002

(30) Foreign Application Priority Data
Aug. 18, 2000 (DE) ................................ 100 40 389

(51) Int. Cl.
*G06F 3/00* (2006.01)
(52) U.S. Cl. ...................................................... 710/52
(58) Field of Classification Search .................. 710/52, 710/53, 107
See application file for complete search history.

(56) References Cited

U.S. PATENT DOCUMENTS

| 5,400,369 | A | * | 3/1995 | Ikemura | ...................... | 375/368 |
| 5,469,544 | A | * | 11/1995 | Aatresh et al. | ............. | 710/110 |
| 5,706,466 | A | * | 1/1998 | Dockser | ...................... | 711/125 |
| 5,802,325 | A | * | 9/1998 | Le Roux | ...................... | 710/301 |
| 6,292,861 | B1 | * | 9/2001 | Fujiyama | .................... | 710/112 |
| 6,480,929 | B1 | * | 11/2002 | Gauthier et al. | ............. | 711/105 |
| 2002/0010810 | A1 | * | 1/2002 | Liu | ................................ | 710/1 |

FOREIGN PATENT DOCUMENTS

| DE | 4406258 A1 | 9/1994 |
| DE | 19827893 C1 | 1/2000 |
| EP | 0149049 A2 | 7/1985 |

OTHER PUBLICATIONS

Delgado-Frias & Diaz, "A VLSI Self-Compacting Buffer for DAMQ Communication Switches," IEEE Eighth Great Lakes Symposium on VLSI, p. 128-133, (Feb. 1998).
Anonymous, "TMS320C3x User's Guide," Texas Instruments Inc., p. i-xix, 2-1-2-27,13-121-13-132, (Jul. 1997).
Park et al., "Design and Evaluation of a DAMQ Multiprocessor Network With Self-Compacting Buffers," p. 713-722, (1994).
IBM Technical Disclosure Bulletin, "Efficient GPR Using Integrated Dual 2-Port Array," p. 7249-7251, (May 1985).
IBM Technical Disclosure Bulletin, "Local Storage Organization with Simultaneous Read and Write," p. 7049-7050, (May 1985).

* cited by examiner

*Primary Examiner*—Kim Huynh
*Assistant Examiner*—David Martinez
(74) *Attorney, Agent, or Firm*—Jenkins, Wilson & Taylor, P.A.

(57) ABSTRACT

High speed processor having a data processing unit (13) for processing data, a data memory (20) which is connected to the data processing unit via a data bus (10) and can be addressed by the data processing unit (13) via a data memory address bus (18), at least one input interface buffer (9) which is connected to the data bus (10) and has the purpose of buffering input data, at least one output interface buffer (16) which is connected to the data bus (10) and has the purpose of buffering output data, the input interface buffer (9) and the output interface buffer (26) being directly addressable by the data processing unit (13) via an interface address bus (24).

21 Claims, 3 Drawing Sheets

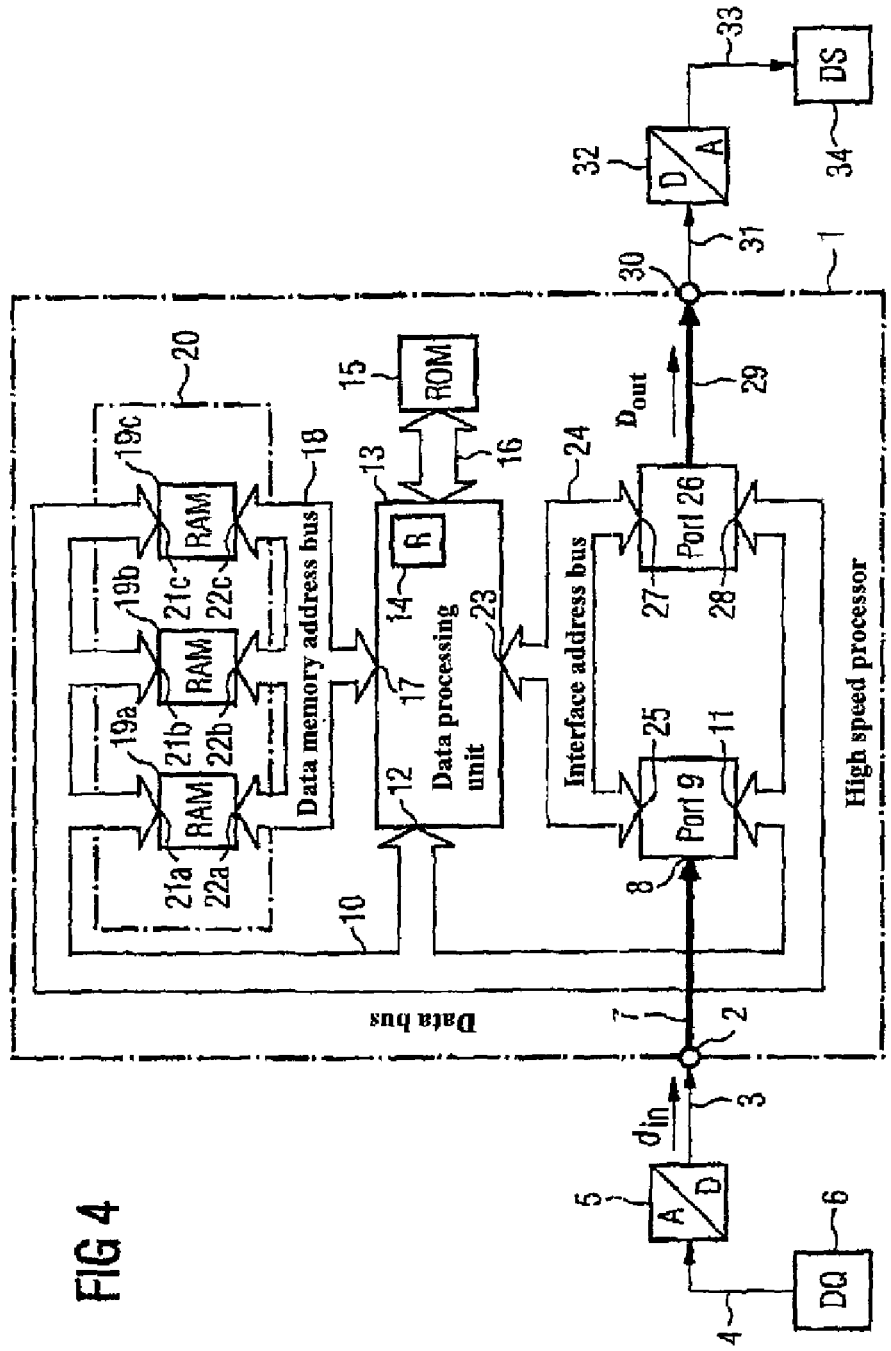

HIGH SPEED PROCESSOR

TECHNICAL FIELD

The invention relates to a high speed processor which is suitable in particular for processing data transmitted by means of xDSL data transmission methods.

RELATED ART

In new telecommunication services, very large quantities of data are transmitted, and the necessary data transmission rates are thus increasing. Multimedia applications require data transmission rates of several megabits per second. The xDSL (Digital Subscriber Line) data transmission method is a digital transmission method in which data are transmitted over conventional telephone lines, i.e. twisted two-wire telephone lines made of copper, to the terminating subscriber. The rising demand for high speed data transmissions is speeding up the development of the transmission networks and the respective terminals.

Figure 1:
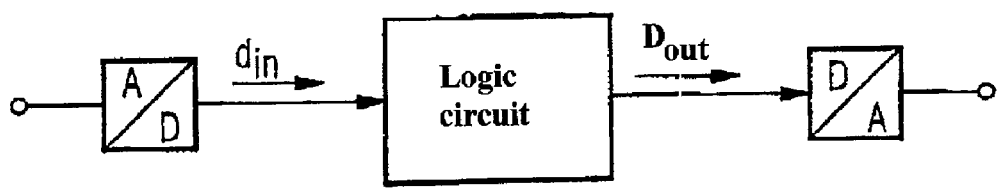

The data which is transmitted at a very high data rate can be processed with hardware logic circuits. For example the deframing of incoming data frames can be carried out by a hardware logic circuit according to the prior art such as is illustrated in FIG. 1. To do this, the incoming digital data stream $d_{in}$ is processed by hardwired logic circuits and output as a data stream $d_{out}$. However, this has the considerable disadvantage that the hardware logic circuit is completely inflexible, i.e. is suitable only for data processing data streams with a permanently predefined data format. A further disadvantage is that the hardwired hardware logic circuits cannot be used universally for different applications, as a result of which the number of manufactured logic circuits for specific applications is relatively low, and the manufacturing piece costs rise to a great extent.

Figure 2:
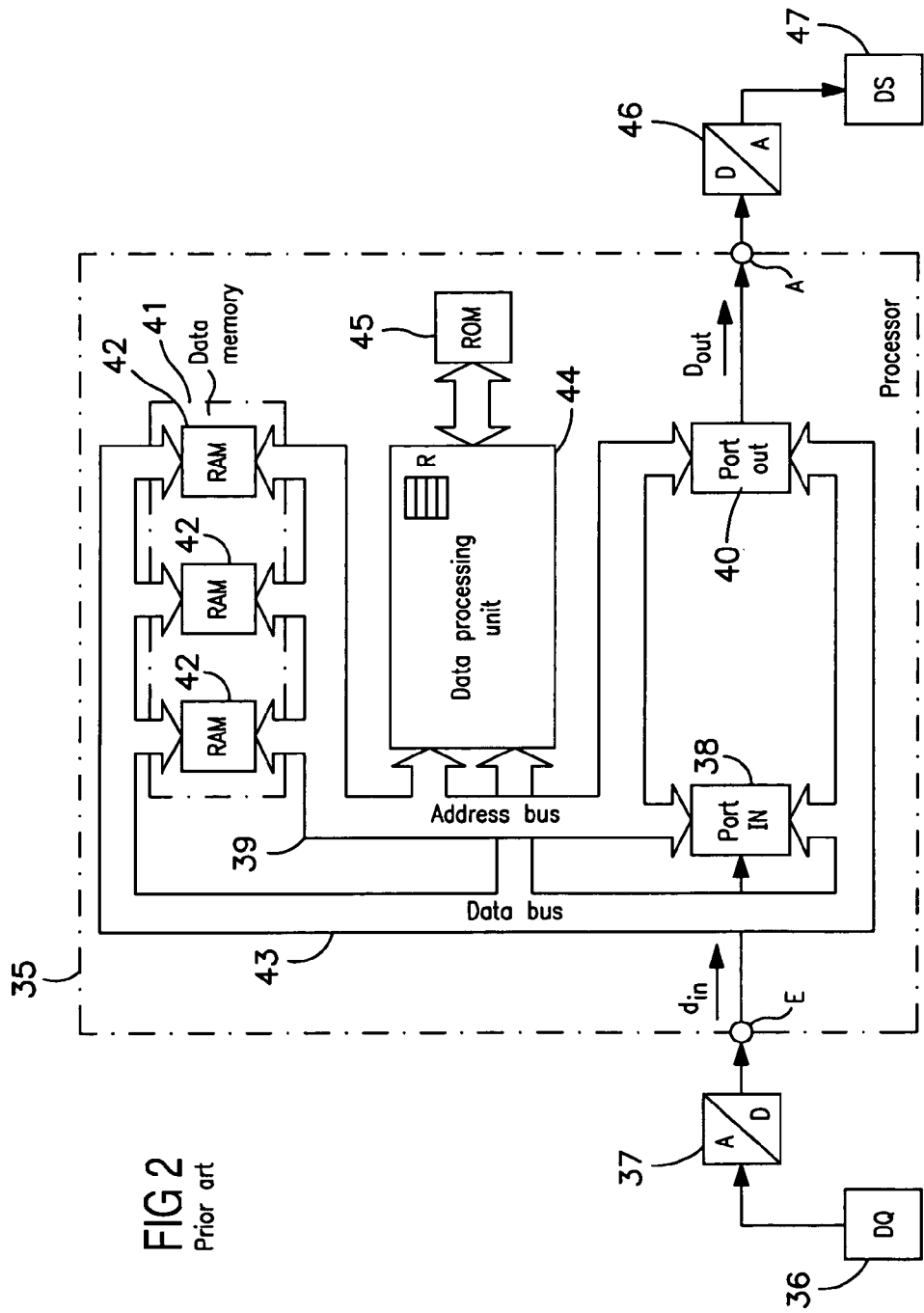

For data processing transmitted data, conventional communications processors which can be used in a flexible way are employed. FIG. 2 shows a conventional communications processor 35 according to the prior art. The data signals which are output by a data source DQ 36 are converted into digital signals by an analog/digital converter 37 and fed to a data input E of the communications processor 35. The incoming digital data stream $d_{in}$ is fed into an input buffer or an input port 38. This input port 38 can be addressed via an address bus 39 of the communications processor 35. The conventional processor 35 which is illustrated in figure 2 has an address bus 39 for addressing the various interface memories or ports 38 and 40 and the data memory 41. The data memory 41 is composed here, e.g. of a plurality of RAM memories 42. The data memory 41 and the interface buffers or ports 38 and 40 are connected to a common data bus 43 for internally exchanging data within the communications processor 35. The core of the processor 35 is formed by a data processing unit 44 which contains internal registers R. The data processing unit 44 is connected to a read only memory or ROM memory 45 in which the executable program is stored. The output ports or output interface memories 38 and 40 are connected via data outputs A for outputting an output data stream $d_{out}$ to digital/analog converters 46 which convert the output digital data into analog output signals. The analog output signals are output to a data sink 47, for example a terminal, via analog lines.

The conventional communications processors are as a rule embodied in what is referred to as RISC (Reduced Instruction Set Computer) processors. RISC processors have a reduced command set of simple assembler instructions.

Figure 3:
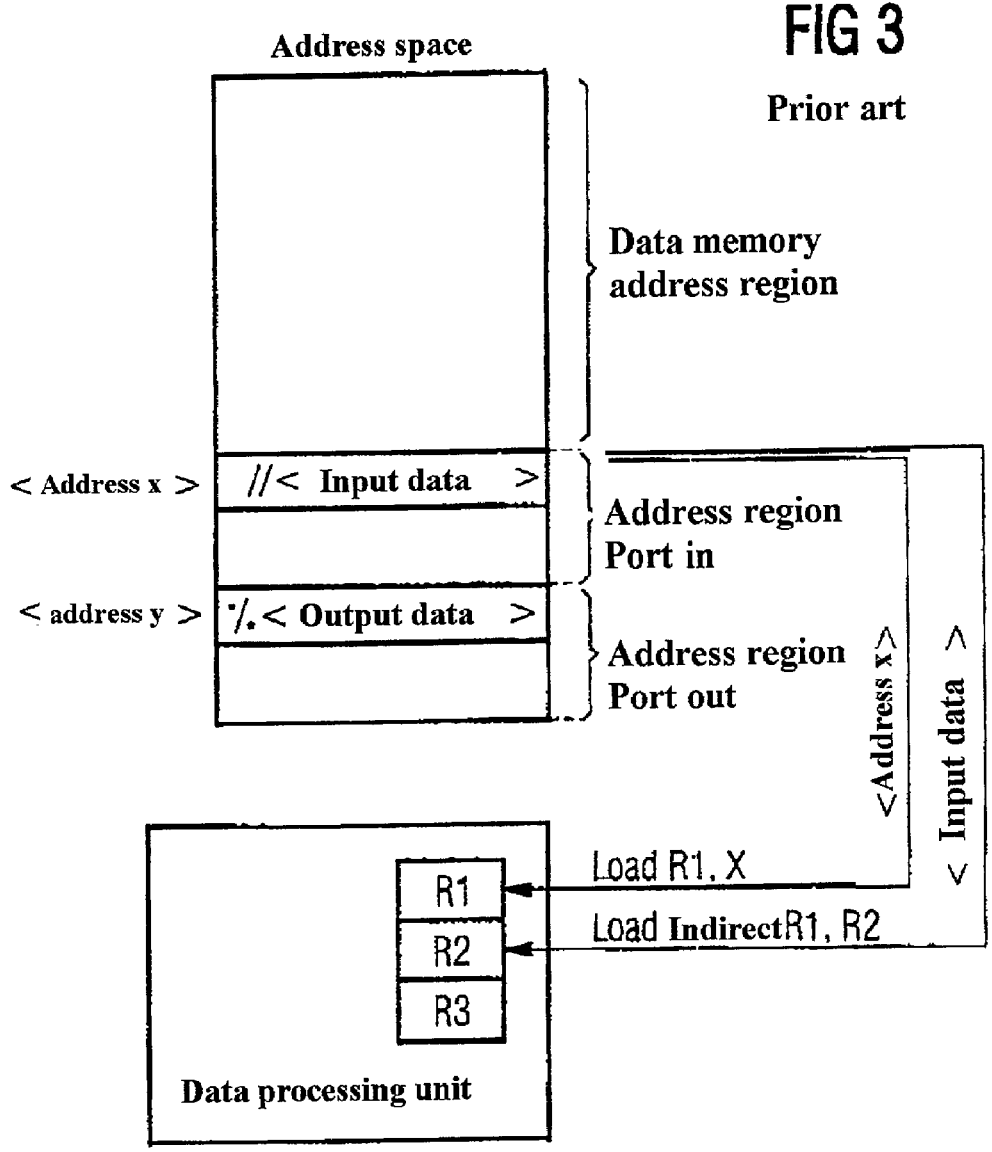

FIG. 3 shows in schematic form the execution of a data loading command in which input data which is buffered in the input interface buffer $port_{in}$ is loaded into the data processing unit of the conventional processor for further data processing. The conventional communications processor according to the prior art, such as is illustrated in FIG. 2, has an address bus for addressing the data memory and the interface buffers. The address space is divided here into a data memory address region and into a port address region. Each buffer or each port has its own address region within the uniform address space. The input data $d_{in}$ which has been fed into the input interface buffer is written in as input data when there is an address x within the address region of the input interface buffer. In order to data process the written-in input data, the address x is firstly loaded into a first register R1 within the data processing unit:

Load R1, x

The address x is now located in the register R1.

The data content of the address x which is stored in the register R1 is then loaded into a second register:

$Load_{indirect}$ R1, R2 in an indirect load or store command. The communications processor according to the prior art thus requires two commands in order to load input data into the data processing unit for data processing.

In many applications, in particular when transmitting and processing data within networks, a large proportion of the transmitted data is not changed by the communications processor but rather transmitted to further, deactivated communications processors or routers or terminals without data manipulation. In particular, the user data (payload) located within data frames is transmitted without being changed.

A data transfer takes place in the communications processor according to the prior art, such as is represented in FIG. 2, in an unwieldy way as a result of the execution of four processor commands.

Firstly, the address x is loaded into a register R1 within the address region of the input port:

Load R1, x

Subsequently, by means of a command the data content of the address x stored in the register R1 is transmitted into an internal register R2 of the data processing unit by means of an indirect load command:

$Load_{indirect}$ R1, R2

In the third processor command, the address y within the address region of the output port is loaded into a third register R3:

Load R3, y

In a fourth processor command, the address content of the register R2 is stored at the address which has been stored in the register R3:

$Load_{indirect}$ R2, R3

In order to transmit the input data from the input interface buffer Port IN to the output interface buffer Port OUT, the conventional communications processor therefore already requires four processor commands. If large quantities of data are passed on to the output A without changing the data which is received at the input E, the data transmission is slowed down considerably owing to the multiplicity of processor commands which are necessary.

SUMMARY OF THE INVENTION

The object of the present invention is therefore to provide a high speed processor which permits a data transfer with a very high data transmission rate.

This object is achieved according to the invention by means of a high speed processor having the features specified in patent claim 1.

The invention provides a high speed processor having a data processing unit for processing data, a data memory which is connected to the data processing unit via a data bus and can be addressed by the data processing unit via a data memory address bus, at least one input interface buffer which is connected to the data bus and has the purpose of buffering input data, at least one output interface buffer which is connected to the data bus and has the purpose of buffering output data, the input interface buffer and the output interface buffer being addressable by the data processing unit via a separate interface address bus.

The data memory preferably contains at least one RAM memory.

In one preferred embodiment of the high speed processor according to the invention, the data processing unit is connected to a ROM memory in which program data is stored.

The data processing unit is preferably an RISC data processing unit.

The data processing unit preferably contains a plurality of addressable internal registers.

The data processing unit of the high speed processor according to the invention can preferably carry out additional data transfer processor commands in order to directly exchange data between the data memory, the internal registers and the interface buffers.

When a first data transfer processor command is carried out by the data processing unit, the input data buffered in the input interface buffer is preferably transmitted directly into an internal register of the data processing unit for further data processing.

When a second data transfer processor command is carried out by the data processing unit of the high speed processor according to the invention, the input data buffered in an input interface buffer is preferably transmitted directly into an output interface buffer for the outputting of data.

When a third data transfer processor command is carried out by the data processing unit of the high speed processor according to the invention, the data buffered in an internal register of the data processing unit is preferably transmitted direction into an output interface buffer for the outputting of data.

When a fourth data transfer processor command is carried out by the data processing unit of the high speed processor according to the invention, the input data buffered in an input interface buffer is preferably transmitted directly into the data memory for storage.

When a fifth data transfer processor command is carried out by the data processing unit of the high speed processor according to the invention, the data stored in the data memory is preferably transmitted directly into an output interface buffer for the outputting of data.

In a preferred embodiment of the high speed processor according to the invention, the input interface buffer is connected to an analog/digital converter.

In a further embodiment of the high speed processor according to the invention, the output interface buffer is preferably connected to a digital/analog converter.

The input interface buffer and the output interface buffer are preferably connected to the data processing unit via a control signal bus.

In a particularly preferred embodiment of the high speed processor according to the invention, the input interface buffer is an xDSL interface buffer for buffering xDSL data.

In a preferred embodiment of the high speed processor according to the invention, the output interface buffer is a PCM interface buffer for buffering PCM data.

Each internal register preferably has a plurality of memory locations for different data words.

In a particularly preferred embodiment, each processor task executed by the data processing unit is assigned a separate internal register. The xDSL input interface buffer preferably has a data frame detecting device for detecting a data frame synchronization data pattern.

Here, the data frame detecting device preferably contains a shift register for writing in input data, a data pattern memory for storing the data frame synchronization data pattern, and a comparator device for bit-by-bit data comparison of the input data written into the shift register with the data frame synchronization data patterns stored in the data pattern memory, the comparator device generating a data frame detection signal if the input data written into the shift register is identical to the stored data frame synchronization data pattern.

After the data frame detection signal has been generated, the shift register is preferably expanded to form a toroidal memory for buffering the received XDSL data. The read counter points to the first stored bit and is moved on by x bits after each reading operation.

Peripherals can preferably be connected to the interface buffers of the high speed processor according to the invention.

The input interface buffers and the output interface buffers of the high speed processor according to the invention can preferably be configured.

DETAILED DESCRIPTION OF THE INVENTION

FIG. 4 shows a preferred embodiment of the high speed processor 1 according to the invention. The high speed processor 1 according to the invention has at least one data input 2 for receiving a digital data stream $d_{in}$ via a data input line 3. The digital input data stream $d_{in}$ is generated by using an A/D converter 5 to convert an analog input signal transmitted via an analog signal line 4. The analog input signal is generated by any desired data source 6. In a preferred embodiment, the analog/digital converter 5 is integrated into the high speed processor 1. The data stream which is present at the digital data input 2 is applied, via internal data lines 7 of the high speed processor 1, to the data input 8 of an input interface buffer or input port 9. The high speed processor 1 has an internal data bus 10 which is connected via a data bus terminal 11 to the input interface buffer 9. The data bus 10 is also connected to a data processing unit 13 of the high speed processor 1 at a data bus terminal 12. The data processing unit 13 or the processor core contains internal registers 14. The data processing unit 13 executes data processing of the data present on the data bus 10, as a function of a program stored in a read only memory or ROM memory 15. The ROM memory 15 is connected via lines 16 to the data processing unit 13 or the processor core. The ROM memory 15 is not located in the processor core because the program length of the program to be stored in the ROM memory 15 varies greatly for different applications. The provision of a separate ROM memory 15 provides the advantage that the flexibility of the high speed processor 1 according to the invention is increased for use in different applications.

The data processing unit 13 is connected via a data memory address bus terminal 17 to a data memory address bus 18. Various RAM memories 19a, 19b, 19c of a data memory 20 can be addressed via the data memory address bus 18. The various RAM memories 19a, 19b, 19c of the data memory 20 are connected to the internal data bus 10 of the high speed processor 1 via data bus terminals 21a, 21b, 21c, and to the data memory address bus 18 of the high speed processor 1 via data memory address bus terminals 22a, 22b, 22c.

The data processing unit 13 also has an interface address bus terminal 13 for connecting to a separate interface address bus 24. The interface address bus 24 is completely separate from the data memory address bus 18 so that an independent interface address space can be addressed by the data processing unit 13. The input interface buffer 9 is connected to the interface address bus 24 via an interface address terminal 25. In addition, an output interface buffer 26 is connected to the interface address bus 24 via an interface address bus terminal 27. The output interface buffer 26 is connected to the data bus 10 of the high speed processor 1 via a data bus terminal 28.

The output interface buffer 26 outputs a digital output data stream $d_{out}$ to a digital output 30 of the high speed processor 1 via data lines 29. The digital data output 30 is connected to a digital/analog converter 32 via a data line 31. The digital/analog converter 32 converts the digital output data stream $d_{out}$ into analog output signals which are output via a signal line 32 to any desired data sink 33, for example a peripheral or a further high speed processor.

The high speed processor 1 according to the invention which is illustrated in FIG. 4 can have a multiplicity of input interface buffers or input ports 9 with associated output interface buffers or output ports. In one preferred embodiment, the high speed processor 1 has four input ports and four output ports.

The high speed processor 1 according to the invention has, owing to the two separate address buses 18, 24 an independent RAM address space for addressing the data memory 20, and an independent port address space for addressing the interface buffers or ports 9, 26. The data processing unit 13 can execute data transfer processor commands which lead to a direct exchange of data between the data memory 20, the registers 14 and the interface buffers 9, 26. Here, data are transmitted with a single processor command between the data memory, a register or a port.

When a first data transfer processor command is carried out by the data processing unit 13, the input data buffered in the input interface buffer 9 is transmitted directly into an internal register of the data processing unit 13 for further data processing:

Load Port, R2

When a further data transfer processor command is carried out by the data processing unit 13, the input data buffered in the input interface buffer 9 (port IN) is transmitted directly, without further data processing, into an output interface buffer 26 (port OUT) for the outputting of data. The associated processor command is as follows:

Load Port$_{in}$, Port$_{out}$

When a third data transfer processor command is carried out by the data processing unit 13, the data buffered in an internal register R of the data processing unit 13 is transmitted directly into the output interface buffer 26 for the outputting of data.

When a fourth data transfer processor command is carried out by the data processing unit 13, the input data buffered in an input interface buffer 9 is transmitted directly into the data memory 20 for storage.

When a fifth data transfer processor command is carried out by the data processing unit 13, data which is stored in the data memory 20 is transmitted directly into the output interface buffer 26 for the outputting of data.

The direct data transfer, in particular from an input port 9 to an output port 26, when a single processor command is carried out permits very high data processing rates of pure user data which does not have to be processed by the high speed processor but rather merely passed on. This is advantageous in particular when the high speed processor 1 is used as a communications computer within a network. In modern networks, data is transmitted in data frames, the data frames generally being composed of control data (headers) and pure user data (payload). The interface buffers of the high speed processor according to the invention can preferably be configured for various data frame types.

The data processing unit 13 is used for protocol processing, in which case it preferably contains what is referred to as a branch unit. The branch control unit transmits the address for the respective following command. It is essentially composed of a buffer for storing the state of a program counter and an adder. The stored program counting value is read out and applied to the ROM memory 15 in order to read out the next processor command from the program memory 15.

The data processing unit 13 also contains a command decoder which extracts the control signals and the addresses from the instructions or commands. In order to ensure a simple structure of the command decoder, the processor commands are preferably divided or segmented. The command decoder contains a circuit for evaluating interrupt signals in order, if appropriate, to bring about a task change. The date processing unit 13 also contains an arithmetic logic unit ALU. The ALU is an arithmetic unit for carrying out arithmetic operations at the bit level. The arithmetic unit or the ALU executes arithmetic operations, shift operations and comparison and bit test operations. The data processing unit 13 controls the input ports and output ports via a port control signal bus with a bit width of, for example, 3 bits.

The programs stored in the ROM memory 15 are processed in the data processing unit 13. In a preferred implementation, the program to be carried out is divided into four tasks. In a particularly preferred embodiment, there are eight registers, a memory for a carry and zero flag and a program counter available for each task. One of the four tasks contains the actual main program. This main program processes the program data contained in the protocol. When an interrupt is triggered, the main task is interrupted and changed into a task assigned to the interrupt. After processing of the interrupt has taken place, there is a jump back into the main task. Because the data processing unit 13 can process various tasks, for example a main task and interrupt processing tasks, each task has a separate memory for the associated program counter.

The high speed processor 1 according to the invention is, in the form in which it is illustrated in FIG. 4, particularly suitable for transmitting and processing xDSL data. The input interface buffer 9 is preferably embodied for this purpose as an xDSL interface buffer for holding xDSL data frames. For this purpose, the xDSL input interface buffer 9 contains a data frame detecting device for detecting a predefined data frame synchronization data pattern. The date frame detecting device contains a shift register for writing in the received digital xDSL input data, and a data pattern memory for storing the predefined synchronized data pattern. The data frame detecting device also contains a comparator device which executes a bit-by-bit data comparison of the input data written into the shift register with the data synchronization data pattern stored in the data pattern memory. If the written-in input data is identical with the stored data frame synchronization pattern, the data frame detecting device detects the start of a new data frame and outputs a data frame detection signal. The shift register is then preferably expanded to form a toroidal memory which is used to buffer the xDSL data contained in the data frame. The buffer of the data bits is controlled by a pointer.

A PCM port or a PCM output interface buffer 26 is preferably used for outputting the user data or payload data contained in the data frame.

The high speed processor 1 according to the invention is characterized by a simple processor architecture and a simple circuit design. In the high speed processor 1 according to the invention, the data transfer is carried out with a very short data transmission time. Owing to the independent interface address space, the high speed processor 1 according to the invention has data transmission processor commands, which permit data to be exchanged between the interface buffers in one step.

During the transmission of data from an XDSL input port 9 to a PCM output port 26, the input port 9 is reset by means of a reset signal before the data transmission by the high speed processor 1 is started. The data bits for the xDSL data frame are inserted into the shift register which compares the written-in data with the stored synchronization data pattern. If the written-in input data are identical to the stored synchronization data pattern, a data frame detection signal is generated as an interrupt request. The interrupt request is passed on to an interrupt control device within the data processing unit 13. The input port 9 contains a toroidal memory, and each data bit can be addressed by means of a separate pointer. The memory is organized according to the FIFO (First In First Out) principle. The input port is supplied with the processor clock and the bit clock of the received xDSL data frame so that each input bit is buffered only once.

The PCM output port 26 stores the user data bits (payload) and as soon as a complete user data block is stored in the PCM output buffer 26, the outputting of the data is started. The PCM output port 25 is preferably composed of a 33×8 bit memory for the B bit and a 8×1 bit memory for the D bits.

LIST OF REFERENCE NUMERALS

1 High speed processor
2 Digital input
3 Data line
4 Analog line
5 Analog/digital converter
6 Data source
7 Line
8 Port input
9 Input interface buffer
10 Data bus
11 Data bus terminal
12 Data bus terminal
13 Data processing unit
14 Internal registers
15 ROM memory
16 Lines
17 Data memory address bus terminal
18 Data memory address bus
19 RAM memory
20 Data memory
21 Data bus terminal
22 Data memory address bus terminal -continued 23 Interface address bus terminal
24 Interface address bus
25 Interface address bus terminal
26 Output interface buffer
27 Interface address bus terminal
28 Data bus terminal
29 Lines
30 Digital data output
31 Lines
32 Digital/analog converter
33 Analog lines
34 Data sink

The invention claimed is:

1. A high speed processor having:
   (a) a data processing unit for processing data;
   (b) a data memory which is connected to the data processing unit via a data bus and can be addressed by the data processing unit via a data memory address bus in a data address space;
   (c) at least one input interface buffer which is connected to the data bus and has the purpose of buffering input data;
   (d) at least one output interface buffer which is connected to the data bus and has the purpose of buffering output data;
   (e) a ROM memory for storing program data, wherein the ROM memory is connected to the data processing unit via lines;
   (f) the input interface buffer and the output interface buffer being directly addressable by the data processing unit via an interface address bus in an independent interface address space, wherein the interface address bus is separate from the data memory address bus; and
   (g) wherein user data which is not to be processed by the data processing unit is passed on by the high speed processor from an addressed input interface buffer to an addressed output interface buffer without data processing when a single predetermined data transfer processor command is carried out by the data processing unit.

2. The high speed processor as claimed in claim 1, wherein the data memory contains at least one RAM memory.

3. The high speed processor according to claims 1 or 2, wherein the data processing unit is an RISC data processing unit.

4. The high speed processor according to claims 1 or 2, wherein the data processing unit contains a plurality of addressable internal registers.

5. The high speed processor according to claims 1 or 2, wherein the data processing unit can carry out a plurality of data transfer processor commands in order to directly exchange data between the data memory, the registers and the interface buffers.

6. The high speed processor as claimed in claim 5, wherein when another predetermined data transfer processor command is carried out by the data processing unit, the input data buffered in the input interface buffer is transmitted directly into an internal register for data processing.

7. The high speed processor as claimed in claim 5, wherein when another predetermined data transfer processor command is carried out by the data processing unit, the data buffered in an internal register of the data processing unit is transmitted directly into the output interface buffer for the outputting of data.

8. The high speed processor as claimed in claim 4, wherein when another predetermined data transfer processor command is carried out, the input data buffered in an input interface buffer is transmitted directly into the data memory for storage.

9. The high speed processor as claimed in claim 7, wherein when another predetermined data transfer processor command is carried out by the data processing unit, the data stored in the data memory is transmitted directly into the output interface buffer for the outputting of data.

10. The high speed processor as claimed in claim 1, wherein the input interface buffer is connected to an analog/digital converter.

11. The high speed processor as claimed in claim 1, wherein the output interface buffer is connected to a D/A converter.

12. The high speed processor as claimed in claim 1, wherein the input interface buffer and the output interface buffer are connected to the data processing unit via a control signal bus.

13. The high speed processor as claimed in claim 1, wherein the input interface buffer is an xDSL interface buffer for buffering data.

14. The high speed processor as claimed in claim 13, wherein the xDSL input interface buffer has a data frame detecting device for detecting a data frame synchronization data pattern.

15. The high speed processor as claimed in claim 14, wherein the data frame detecting device has a shift register for writing in input data, a data pattern memory for storing the data frame synchronization data pattern and a comparator device for bit-by-bit data comparison of the input data written into the shift register, and of the data frame synchronization data pattern stored in the data pattern memory,
the comparator device generating a data frame detection signal if the input data written into the shift register is identical to the stored data frame synchronization data pattern.

16. The high speed processor as claimed in claim 15, wherein after the data frame detection signal is generated, the shift register is expanded to form a toroidal memory for buffering the xDSL data.

17. The high speed processor as claimed in claim 1, wherein the output interface buffer is a PCM interface buffer for buffering PCM data.

18. The high speed processor as claimed in claim 4, wherein each internal processor has a plurality of memory locations for different data words.

19. The high speed processor as claimed in claim 4, wherein each processor task executed by the data processing unit is assigned a separate internal register.

20. The high speed processor as claimed in claim 1, wherein peripherals can be connected to the interface buffers.

21. The high speed processor as claimed in claim 1, wherein the input interface buffer and the output interface buffer can be configured.

* * * * *